L. E. ADAMS.
CUSPIDOR.
APPLICATION FILED DEC. 1, 1916.

1,254,561.    Patented Jan. 22, 1918.

WITNESSES
Frederick W Ely
J. Wilcox

INVENTOR
L. E. Adams.
BY Victor J. Evans
ATTORNEY

UNITED STATES PATENT OFFICE.

LOUIS E. ADAMS, OF RAVEN, ALBERTA, CANADA.

CUSPIDOR.

1,254,561.　　　　　Specification of Letters Patent.　　Patented Jan. 22, 1918.

Application filed December 1, 1916.　Serial No. 134,370.

*To all whom it may concern:*

Be it known that I, LOUIS E. ADAMS, a subject of the King of Great Britain, residing at Raven, in the Province of Alberta and Dominion of Canada, have invented new and useful Improvements in Cuspidors, of which the following is a specification.

This invention relates to cuspidors and it consists in the novel features hereinafter described and claimed.

An object of the invention is to provide a cuspidor composed of separable parts adapted to be disconnected from each other whereby the cuspidor may be thoroughly cleaned.

Another object of the invention is to provide a cuspidor of such configuration or design as to prevent the contents thereof from spilling in the event that the cuspidor is knocked over.

With these objects in view the cuspidor comprises a hood which is bounded around its upper edge by an annular curved flange and which is provided with an annular shoulder adapted to rest upon a ledge provided upon the body of the cuspidor. A spider is connected with the hood and a spring pressed bolt is carried by the said spider and adapted to engage in a slot provided in the body of the cuspidor whereby the parts are held in connected positions.

In the accompanying drawing:—

Figure 1:
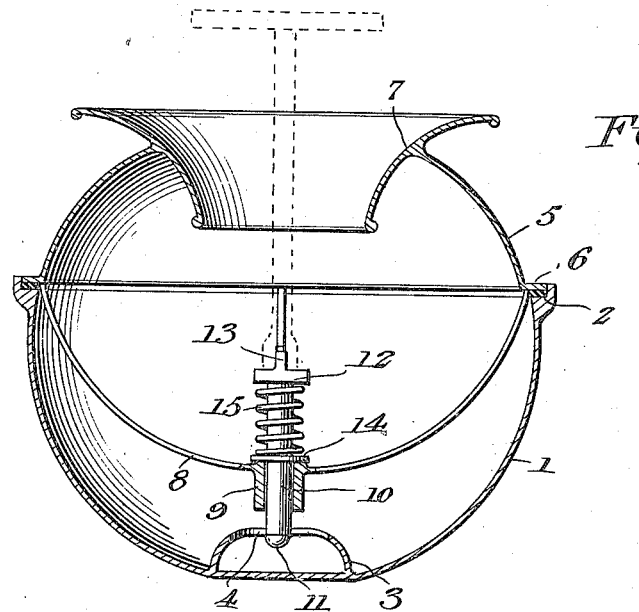
Figure 1 is a vertical sectional view of the cuspidor.
Figure 2:
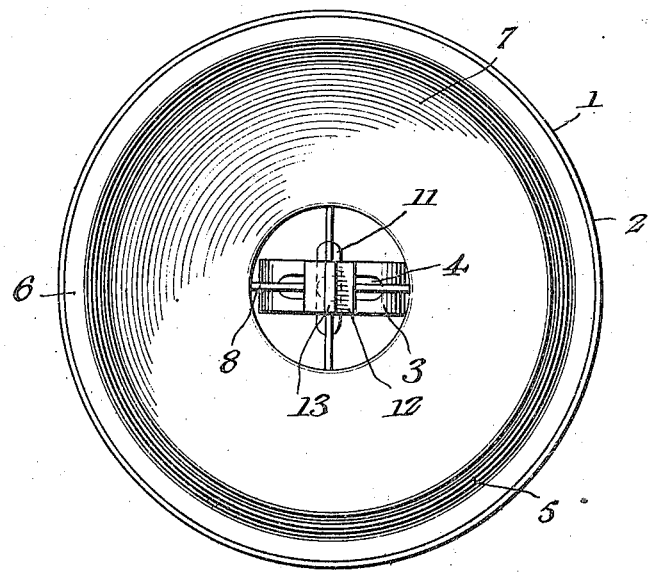
Fig. 2 is a top plan view of the same.
Figure 3:
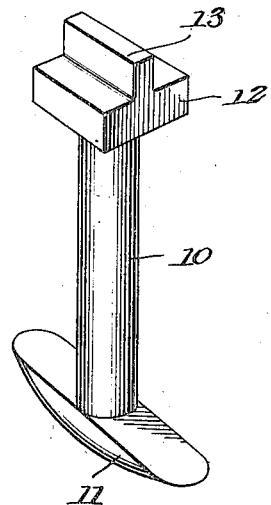
Fig. 3 is a perspective view of a bolt used in the same.

The cuspidor comprises a body 1 which is provided at the inner surface of its upper portion with an annularly disposed ledge 2. This ledge may support a packing ring of rubber or other suitable material. The body 1 is provided at its center with a stand 3 having slots 4.

The cuspidor further includes a hood 5 having at its lower portion an annular shoulder 6 adapted to rest upon the ledge 2 provided upon the body 1. The said hood 5 is bounded around its upper edge with a curved flange 7 which is disposed transversely with relation to the side walls of the said hood. A spider 8 is attached to the lower portion of the hood 5 and is adapted to enter the body 1 below the ledge 2 thereof. A vertically disposed sleeve 9 is carried at the center of the spider 8 and the shank of a bolt 10 is slidably mounted in the said sleeve. The bolt 10 is provided with a relatively long and narrow head 11 which is adapted to be inserted in the slot and which when disposed transversely with relation to the said slot engages under the opposite side edges thereof whereby the spider 8 and the parts connected therewith are securely held in position upon the body 1. A nut 12 is mounted upon the upper end of the bolt 10 and is provided with a lug 13 adapted to be engaged by a wrench or other suitable implement whereby the said bolts 10 may be turned to engage the head 11 thereof and under the opposite side edges of the slot 4 and disengage the head from the said slot. A washer 14 is slidably mounted upon the intermediate portion of the bolts 10 and rests upon the upper end of the sleeve 9. A coil spring 15 is interposed between the washer 14 and the nut 12 and is under tension with a tendency to hold the bolt 10 in an elevated position in the sleeve 9.

At the time that the parts of the cuspidor are assembled the bolt 10 is moved longitudinally in a downward direction whereby the head 11 is inserted in the slot 4 of the stand 3. The said bolt 10 is then given a quarter turn whereby the end portions of the head 11 are caused to engage under the opposite side portions of the slot whereby the hood 5 is held in position upon the body 1. To remove the hood from the body the bolt 10 is turned so that the long dimension of the head 11 is brought into alinement with the long dimension of the slot 4 and hence the said head 11 is lifted out of the said slot under the influence of the spring 15. When the said bolt is disconnected from the slot the hood 5 may be readily detached from the body 1 for cleaning or other purposes.

From the foregoing description taken in conjunction with the accompanying drawing, it will be seen that a cuspidor of simple and durable structure is provided and that the parts thereof may be readily separated for cleaning or other purposes and also the parts are so arranged or assembled as to prevent the contents of the cuspidor from spilling from the same in the event that the cuspidor is knocked over.

Having described the invention what is claimed is:—

1. A cuspidor comprising a body having at its central portion a stand provided with a slot and having in the vicinity of its edge an inwardly disposed ledge, a hood having a shoulder adapted to rest upon the ledge, a spider carried by the hood and provided with a sleeve and a spring pressed bolt turnably mounted in the sleeve and having a head portion adapted to be inserted through the said slot and caught under the opposite edges thereof.

2. A cuspidor comprising a body provided at its central portion with a stand having a slot and also having in the vicinity of its edge an inwardly disposed ledge, a hood having its upper edge bounded by a transversely curved flange, said hood also having a shoulder which rests upon the said ledge, a spider carried by the hood and provided with a sleeve, a spring pressed bolt slidably mounted in the sleeve and having a head adapted to be inserted through the slot and caught under the opposite side portions thereof.

In testimony whereof I affix my signature.

LOUIS E. ADAMS.

Copies of this patent may be obtained for five cents each, by addressing the "Commissioner of Patents, Washington, D. C."